(12) United States Patent
Kouts

(10) Patent No.: US 9,700,170 B1
(45) Date of Patent: Jul. 11, 2017

(54) ROLLER BEARING SYSTEM

(71) Applicant: Richard Kouts, Lufkin, TX (US)

(72) Inventor: Richard Kouts, Lufkin, TX (US)

( * ) Notice: Subject to any disclaimer, the term of this patent is extended or adjusted under 35 U.S.C. 154(b) by 0 days.

(21) Appl. No.: 15/266,643

(22) Filed: Sep. 15, 2016

Related U.S. Application Data

(60) Provisional application No. 62/272,680, filed on Dec. 30, 2015.

(51) Int. Cl.
| | | |
|---|---|---|
| *E05D 15/16* | (2006.01) | |
| *A47H 13/00* | (2006.01) | |
| *A47H 15/02* | (2006.01) | |
| *F16C 29/04* | (2006.01) | |
| *A47H 1/04* | (2006.01) | |
| *A47H 13/04* | (2006.01) | |

(52) U.S. Cl.
CPC ............. *A47H 15/02* (2013.01); *A47H 1/04* (2013.01); *F16C 29/04* (2013.01); *A47H 13/04* (2013.01)

(58) Field of Classification Search
CPC . Y10T 16/353; Y10T 16/354; Y10T 16/3543; Y10T 16/376; Y10T 16/379; Y10T 16/35; Y10T 16/373; E05Y 2201/684; E05Y 2201/644; E05Y 2201/646; E05Y 2201/668; E05Y 2900/108; E05Y 2201/114; E05D 15/06; E05D 15/0652; E05D 15/0626; E05D 15/063; E05D 15/0643; E05D 15/0647; E05D 15/165; E05D 15/0215; A47H 1/02; A47H 1/04; A47H 1/10; A47H 1/13; A47H 1/102; A47H 1/104; A47H 1/124; A47H 2001/0215; A47H 2001/021; A47H 2001/047; A47H 515/00; A47H 515/02; A47H 515/04; A47H 23/00; A47H 5/02; A47H 5/03; A47H 5/0325; A47H 5/032; A47H 15/00; A47H 15/02; A47H 15/04; A47H 13/00; A47H 13/02; A47H 13/04
See application file for complete search history.

(56) References Cited

U.S. PATENT DOCUMENTS

| | | | | |
|---|---|---|---|---|
| 1,818,786 A | * | 8/1931 | Bond | A47H 1/04 16/95 D |
| 2,350,689 A | * | 6/1944 | Long | E05D 15/0652 16/96 R |
| 2,715,966 A | * | 8/1955 | Tieck | A47H 15/02 104/108 |
| 3,023,450 A | * | 3/1962 | Renner | A47H 15/02 16/87.6 R |

(Continued)

FOREIGN PATENT DOCUMENTS

| | | | | |
|---|---|---|---|---|
| AT | EP 3085281 A1 | * | 10/2016 | A47H 15/02 |
| DE | WO 9219137 A2 | * | 11/1992 | A47H 13/04 |

*Primary Examiner* — Chuck Mah
(74) *Attorney, Agent, or Firm* — Law Office of Jeff Williams; J. Oliver Williams

(57) ABSTRACT

The present application provides a roller bearing system comprising one or more bearings having a plurality of substantially hemispherical members. Each member includes an interior. A sleeve is disposed within each hemispherical member interior and configured to accept a shaft that passes through each hemispherical member, such that the hemispherical member turns about the shaft. Each also includes at least one stem coupled to the shaft. The stem is configured to provide a point of attachment to a particular bearing.

15 Claims, 6 Drawing Sheets

(56) References Cited

U.S. PATENT DOCUMENTS

| | | | | |
|---|---|---|---|---|
| 3,359,592 A * | 12/1967 | Saltz | ...................... | A47H 15/04 16/93 D |
| 3,577,930 A * | 5/1971 | Rooklyn | ................ | B65G 17/20 104/103 |
| 4,682,630 A * | 7/1987 | Schukei | ................ | F22B 37/222 138/89 |
| 4,887,657 A * | 12/1989 | Spohr | ..................... | E06B 9/365 160/173 R |
| 5,421,059 A * | 6/1995 | Leffers, Jr. | ............. | A47H 1/104 16/87.4 R |
| 5,937,928 A * | 8/1999 | Chou | ..................... | E06B 9/362 160/168.1 V |
| 5,960,967 A * | 10/1999 | Neil | ..................... | A47F 5/0846 211/94.01 |
| 6,052,867 A * | 4/2000 | Haab | ................... | E05D 15/063 16/87 R |
| 8,046,872 B2 * | 11/2011 | Burgess, III | ........ | E05D 15/0639 16/103 |
| 2012/0011681 A1 * | 1/2012 | Scharf | ................... | A47H 5/032 16/87.8 |
| 2013/0042984 A1 * | 2/2013 | Croucher | ............... | A47H 13/16 160/330 |

\* cited by examiner

ROLLER BEARING SYSTEM

CROSS REFERENCE AND RELATED APPLICATIONS

This application claims the benefit of U.S. provisional Patent Application No. 62/272,680 entitled "Slide-Easy Curtain Rod," filed on 30 Dec. 2015 by Richard Kouts, the disclosure of which is incorporated herein by reference.

BACKGROUND

1. Field of the Invention

The present application relates generally to a bearing system, and in particular to a track roller bearing system that supports a load underneath the track.

2. Description of Related Art

Rail bearing systems usually must overcome several problems. These problems include friction, moving over joints smoothly, and following tight turns in the rail. Often these rail bearing systems are used to carry or translate an object along a path defined by the rail. A common example of a rail system in a simplistic form is that of a curtain rod.

Curtains and drapes are used by a majority of homeowners, hospitals, hotels and restaurants. A typical curtain rod has a number of carriers, or slides, that travel at least a portion of the curtain rod length. The carrier usually couples to the curtain material using a hook. It can be difficult to pull curtains entirely across a rod without the carrier, or slide catching on the rod, which is frustrating and inconvenient. Tugging or pulling at the curtain to unseat it from the catch point may cause the rod to dislodge from its secured position and fall. Further, tugging can cause the curtain material to tear.

Standard curtain rods are usually comprised of two or more pieces in which one piece slides through the other to elongate the rod. These multi-piece rods sometimes come apart when opening and closing drapes. The joint between rods also causes a bump in the rod which may cause the carrier to catch the rod, to which the user responds with extra force before they try to jiggle the carrier or back it up and then try to move it with greater velocity.

While the majority of curtain rods are straight, there are design situations that require the rod be curved, including tight turns. Linear carriers can be too long to follow the turn and will jam in the curtain rod.

It is desired that a rail bearing system be developed to that allows a user to translate the bearings freely along the rail without hindrance or obstruction, thereby reducing user frustration and reducing the possibility of the curtain rod collapsing due to increased stresses. Additionally, tight turns in the rail can cause the carrier to jam in the curved track. Although great strides have been made, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
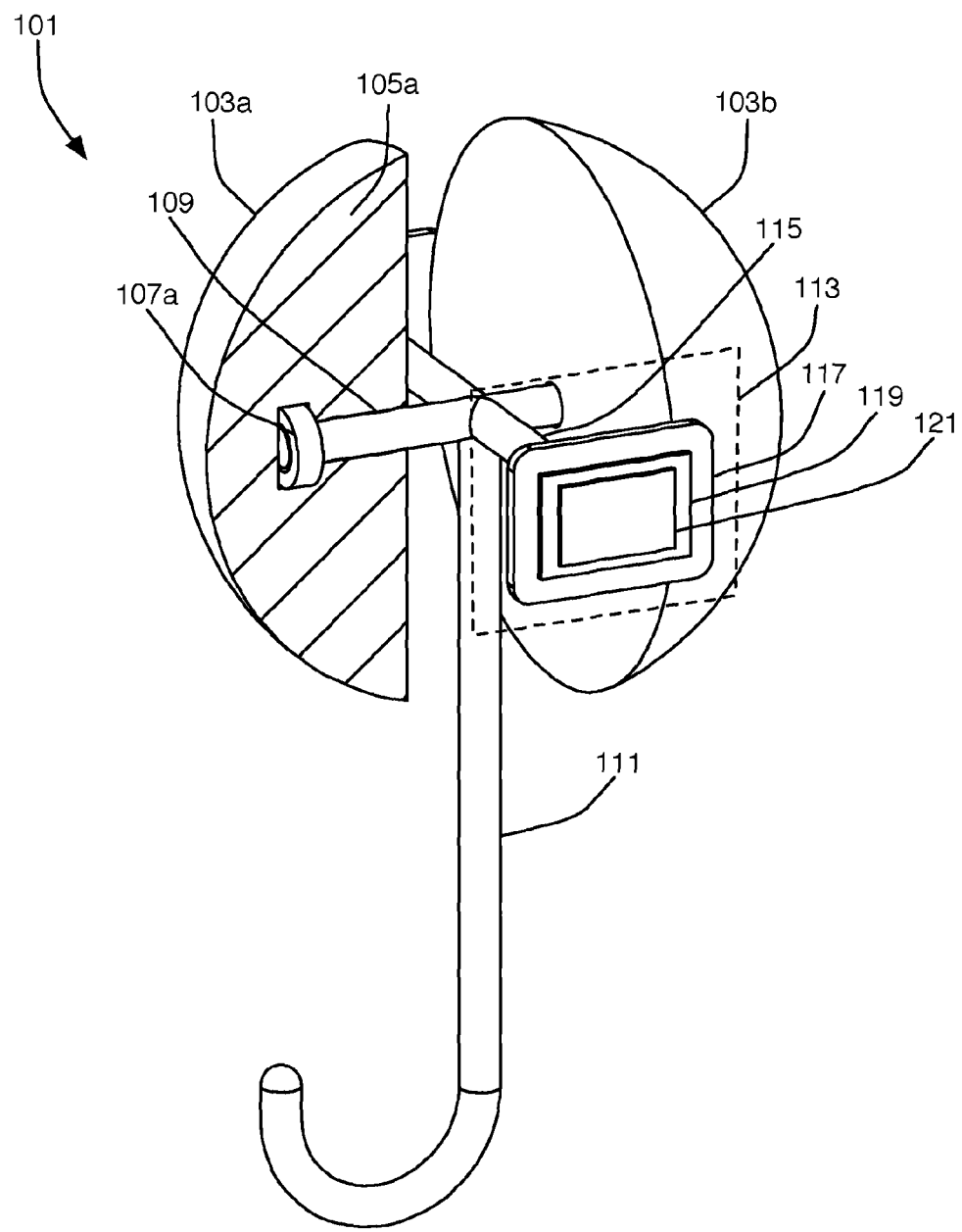
FIG. 1 is a partially sectioned view of a bearing system used within a roller bearing system according to an embodiment of the present application.

While the assembly and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system and method in accordance with the present application overcomes one or more of the above-discussed problems commonly associated with conventional rail systems. The system and method of the present application describes a roller bearing system that is configured to allow a user to translate one or more bearings along a rail without hindrance from unnecessary forces. The plurality of bearings are unique and configured to smoothly glide within the rail. The rail and bearings are also unique in their relative location within each other. The system may be used without much effort, thereby reducing user frustration, reducing the possibility of the rail collapsing and reducing the possibility of damaged materials.

The roller bearing system includes a hollow rail or rod having an opening extending between a pair of ends. The opening extends from the exterior of the rod into an inner hollow volume of the rod. The rod can be composed of metal, plastic or any other suitable material. A plurality of bearings are disposed along the inner volume of the rod. Each bearing comprises a spherical member having an interior with a shaft extending therethrough. The shaft is T-shaped with one or more ends that connect to a bearing. The bearing facilitates the movement of the spherical member along the inner volume of the rod. Each side of the bearing has a pad connected to a metal plate. The pad cushion the contact between to bearings while the metal plate may comprise a magnet attracting a magnet on a neighboring bearing. When the bearings are translated along the rod, they may either separate from one another or may group together. The bearings have a hook that extends vertically downward from the shaft, the hook being configured to receive material, such as a curtain or drape. These and other unique features of the system and method are discussed below and illustrated in the accompanying drawings.

The system and method will be understood, both as to its structure and operation, from the accompanying drawings, taken in conjunction with the accompanying description. Several embodiments of the assembly are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

Referring now to the drawings wherein like reference characters identify corresponding or similar elements in form and function throughout the several views. FIG. 1 illustrates a cutaway view of the bearing system 101 of the present application. Bearing system 101 is a part of roller bearing system 100 as seen more clearly in the subsequent drawings. A portion of bearing system 101 has been cut away to view the bearing interior. System 101 is configured to allow the bearing to move smoothly along a rail (i.e. a track, a trough, a rod). The rail can be used to describe any device that is configured to provide a guided route for the traveling of system 101. For purposes herein, the rail will be shown as a rod.

System 101 is comprised of two hemispheres 103a and 103b, each hemisphere having an interior 105a, sleeves 107a, and a shaft 109. Interior 105a is shown in the FIG. 1. Sleeve 107a is disposed within interior 105a as shown in FIG. 1. The interior and sleeve of hemisphere 103b is not shown. Shaft 109 passes through the sleeves allowing the hemispheres to rotate around shaft 109. Hemispheres 103a and 103b may rotate at different rates, such as when the bearing travels around a turn. Examples of sleeve 107a may include an insert, a bushing or a ball bearing.

The shape of hemispheres 103 may be modified. As an example, portions of hemispheres 103 may be truncated to accommodate a narrower track configuration, while retaining a smooth, round surface in contact with the track. The surface of hemispheres 103 may be selectively modified. Examples of surface modifications may include a rubber coating to decrease noise, and a metal deposition or ion implant to enhance the durability of system 101.

Bearing system 101 may include one or more stems 111, coupled to shaft 109. The purpose of stem 111 is to provide at least one point of attachment to bearing system 101. Stem 111, as shown in FIG. 1 is located to pass between hemispheres 103a and 103b. One possible example of stem 111 is a hook as shown in FIG. 1. Other examples may include a loop, a clip, a threaded stud or a hook and loop fastener. Other stem types are conceived. Stem 111 usually extends past the hemispheres 103 surface as shown in FIG. 1, however this may not be the case for some configurations.

Bearing system 101 may include one or more bumpers 113. Bumper 113 is coupled to shaft 109 and located to selectively control interaction of bearing system 101 with a track or other bearings. Bumper 113 is comprised of a coupler 115 and a plate 117 coupled to coupler 115. Coupler 115 couples shaft 109 with plate 117. Bumper 113 may further comprise a magnet 119 configured to attract other magnets either coupled to the track or as a part of adjacent bearings 101. Bumper 113 may also include a pad 121, configured to cushion the shock of impact as bearing system 101 moves and bumps into other bearings 101 or a track. Examples of a pad 121 material include felt, rubber, and cork. Other materials may be used as appropriate. Pad 121 may be coupled to magnet 119 or coupled to plate 117. Both the pad and the metal plate are rectangular, although any suitable shape can be used. The pad is a mold resistant hard rubber although any other suitable material can be used.

Figure 2:
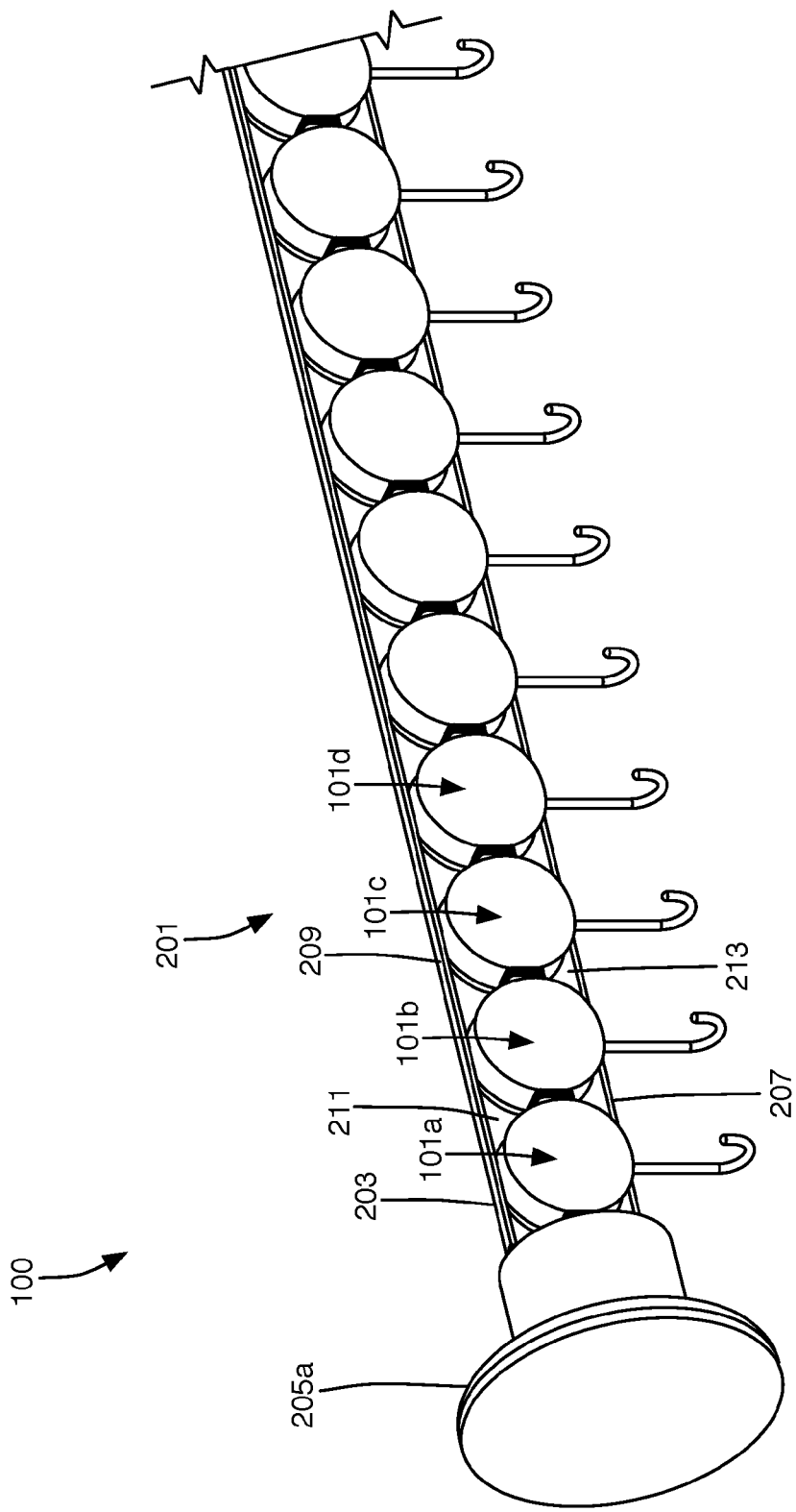
FIG. 2 is a partially sectioned view of an exemplary embodiment of the roller bearing system, comprising a plurality of the bearing system of FIG. 1.

Referring now also to FIG. 2 in the drawings, a cutaway view of a portion of roller bearing system 100 is illustrated. In this exemplary embodiment of system 100, the rail or rod is shown for use as a curtain rod system. It is understood that system 100 may be used with unlimited different uses and configurations, such that this particular embodiment is not meant to limit system 100. System 100 includes one or more bearings 101 and a rail, seen as rod 203 in FIG. 2.

The exemplary embodiment of system 100, namely curtain rod system 201 further includes end caps. Curtain rod system 201 is configured to allow bearings 101 to smoothly move along the curtain rod. System 201 is comprised of a hollow rod 203, a plurality of roller bearings 101a, 101b, 101c, 101d, and end caps 205a. The opposing end cap along hollow rod 203 is not shown. Hollow rod 203 is configured to expand axially to fit into a variety of spaces. Hollow rod 203 has an opening 207 at least partially extending between the end caps 205a. The opening extends from exterior 209 to interior volume 211 of hollow rod 203. Roller bearings 101 contact at least a portion of the interior surface 213 of interior volume 211. An example of material hollow rod 203 may comprise includes metal, plastic or any other suitable composition.

Figure 3:
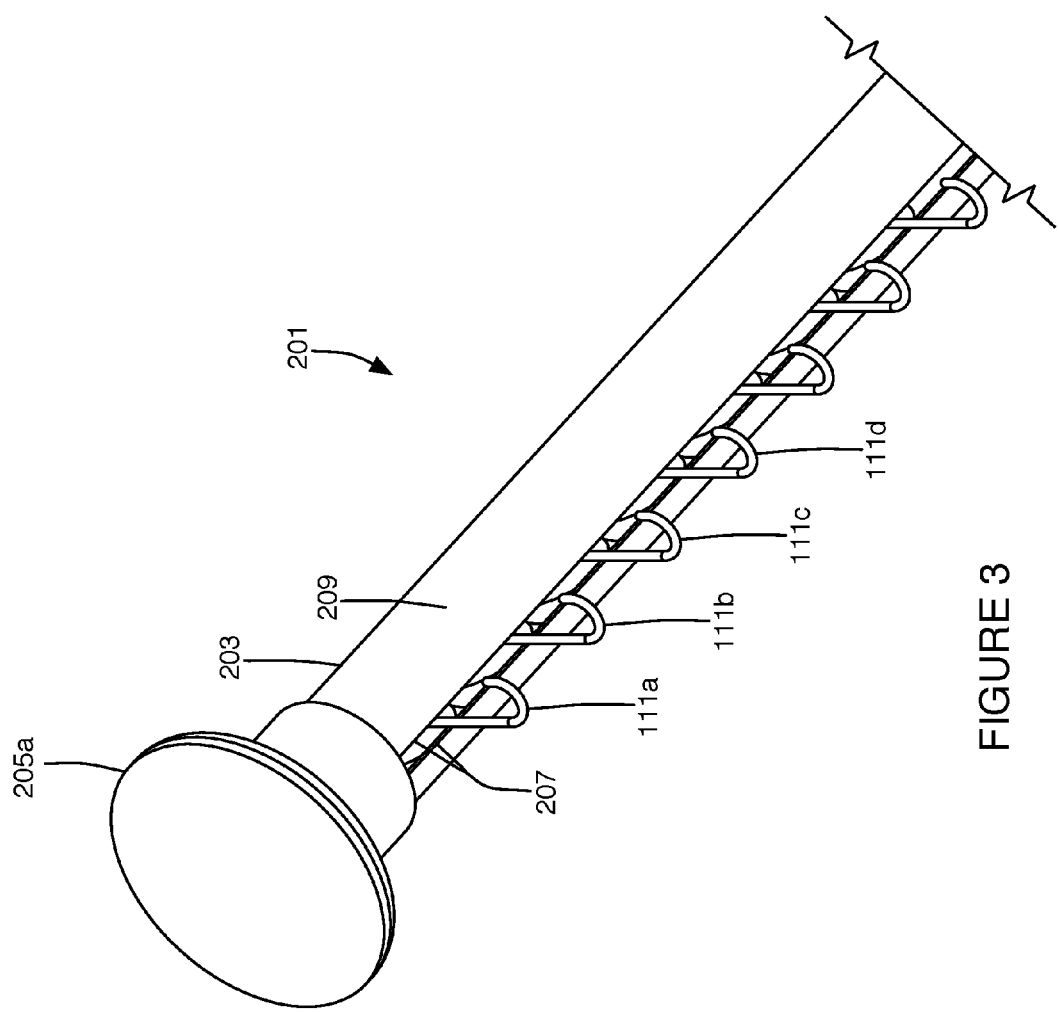
FIG. 3 is a bottom perspective view of the exemplary roller bearing system of FIG. 2.

Referring now also to FIG. 3 in the drawings, a bottom perspective view of curtain rod system 201 is illustrated. Stems 111a, 111b, 111c, and 111d are shown protruding through opening 207.

Figure 4:
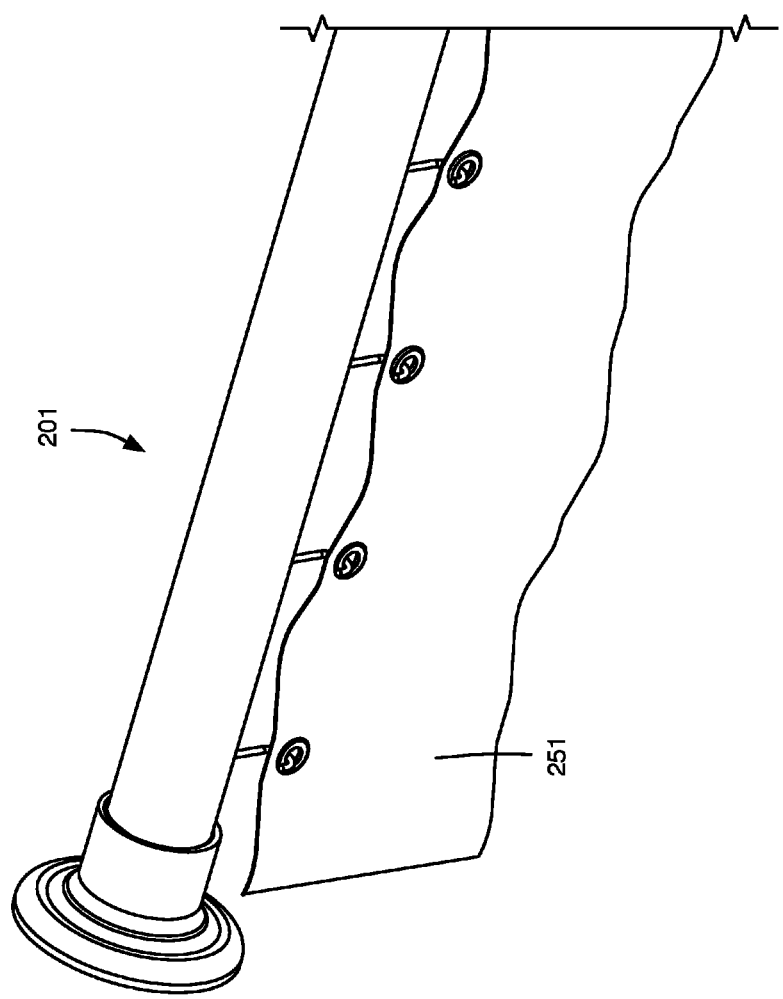
FIG. 4 is an alternate perspective view of the exemplary roller bearing system of FIG. 2, the rod system being coupled to a curtain.

Referring now also to FIG. 4 in the drawings, a top perspective view of curtain rod system 201 coupled to curtain material 251 is illustrated.

Figure 5:
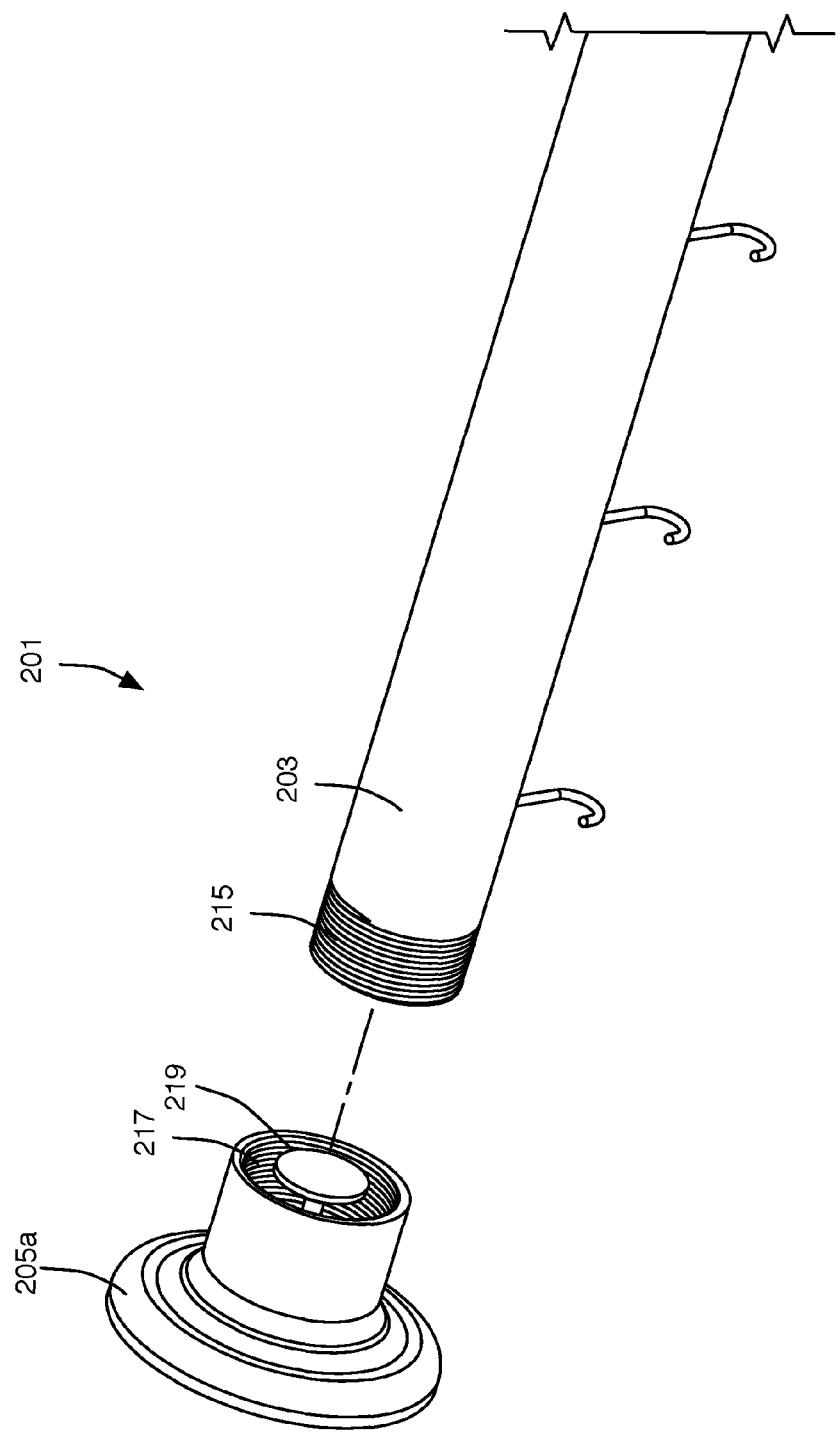
FIG. 5 is a partially exploded view of the exemplary roller bearing system of FIG. 2.

Referring now also to FIG. 5 in the drawings, a top perspective view of a portion of system 201 showing a method of attachment of end cap 205a to hollow rod 203 using threads is illustrated. The exterior 209 of rod 203 threaded to mate with end cap threads 217. Other methods of attachment may include set screw, press fit, adhesive and barbs for example. End cap 205 may also include a magnet 219 located to attract roller bearing 101.

The form and function of endcaps 205 may vary according to aesthetic and use considerations. For example the endcaps 205 of FIGS. 3, 4 and 5 are designed to spread force over a larger area to couple to a wall. Other methods of coupling curtain rod system 201 to a wall may include brackets holding curtain rod system 201 other than by spreading force over end caps 205. In such a case the end cap may be designed simply to hold the bearings 101 inside the hollow curtain rod 203.

Figure 6A:
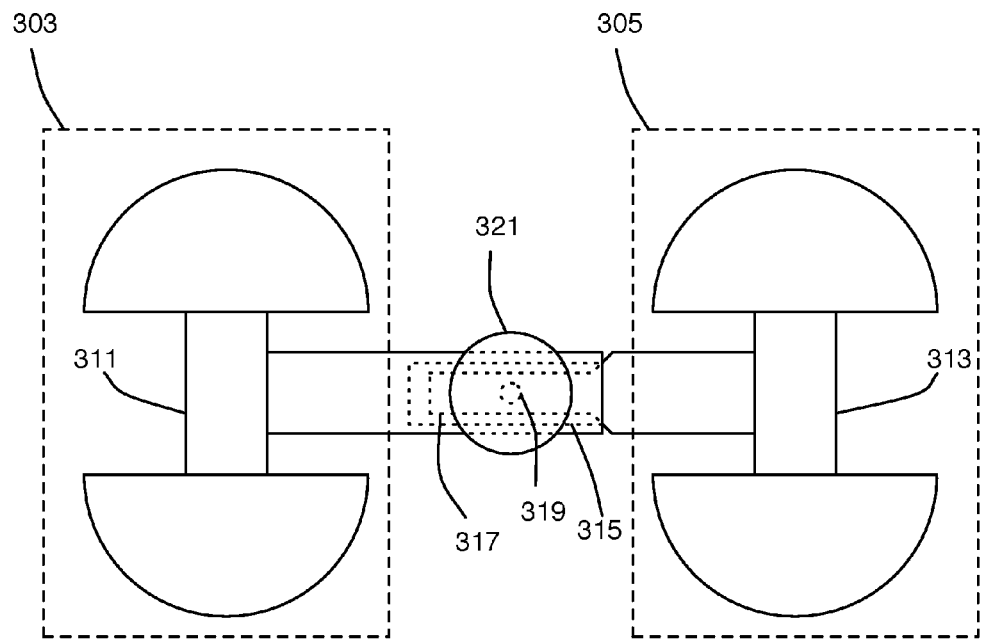
FIG. 6A is a top view of an alternate embodiment of two bearing systems from the bearing system of FIG. 1.
Figure 6B:
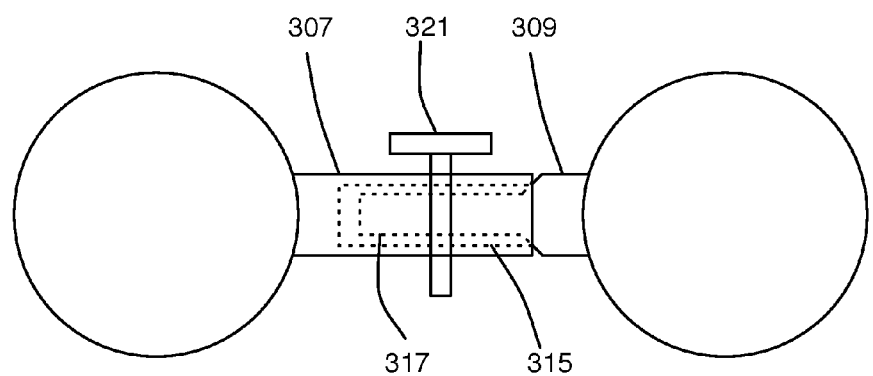
FIG. 6B is a side view of the two bearing systems of FIG. 6A from the bearing system of FIG. 1.

Referring now to FIGS. 6A and 6B in the drawings, an alternative embodiment of bearing system 101 is illustrated. FIG. 6A is a top view of system 301 and FIG. 6B is a side view of system 301. System 301 replaces bumpers 113 with a pin connection system. The pin connection system is configured to join bearings 101 with a pin. Bearings 303 and 305 are similar to bearing system 101 in form and function except as noted herein. System 301 comprises a first bearing 303 and a second bearing 305 coupled to each other using a first connector 307 and a second connector 309, and a pin 319. Bumper 113 of FIG. 1 is replaced with first connector 307 and second connector 309 in FIGS. 6A and 6B. First connector 307 is coupled to first shaft 311 and second connector 313 is coupled to second shaft 315. First connector 307 includes a hollow end 315 and is located so as to couple with second connector 309. Second connector 309 includes a reduced circumference end 317 configured to fit at least partially within hollow end 315. A plurality of holes 319 is located in both hollow end 315 and reduced circumference end 317 such that when reduced circumference end 317 is inserted into hollow end 315, the holes line up to form a coupler hole 319 into which a pin 321 is inserted.

Joining first bearing 303 and second bearing 305 may also be accomplished in other ways. One example is laying connectors one on top of the other and joining with a pin. Another example is laying connectors aside each other and joining with a pin. Other connectors are contemplated. An example of an alternative to using a pin might be using a loop of wire, a clevis pin or some other suitable method.

The current application has many advantages over the prior art including at least the following: (1) spherical rollers make draperies easier to open and close; (2) the user experiences less frustration in adjusting the draperies; (3) the user is less likely to pull the curtain rod down due to the ease of adjustment; and (4) drapery material is less likely to be torn due to the user using excessive force on the drapes while adjusting them.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A roller bearing system, comprising:
 a first bearing having:
 a plurality of substantially hemispherical members each having an interior;
 a shaft located to pass through each hemispherical member such that the hemispherical member turns about the shaft;
 at least one stem coupled to the shaft, the stem configured to be coupled to the plurality of substantially hemispherical members; and
 a bumper coupled to the shaft and configured to attach to maintain spacing with an adjacent roller bearing.

2. The system of claim 1, further comprising:
 a sleeve disposed within each hemispherical member interior and configured to accept the shaft.

3. The system of claim 1, wherein the bumper is removable from the shaft.

4. The system of claim 1, wherein the bumper includes:
 a plate;
 a coupler configured to couple the shaft to the plate;
 a pad coupled to the plate, wherein the pad cushions the impact of the roller bearing with the adjacent roller bearing.

5. The system of claim 4, further comprising:
 a magnet disposed between the plate and the pad, wherein the magnet attracts the adjacent roller bearing.

6. The system of claim 1, further comprising:
 a second bearing including:
 a plurality of substantially hemispherical members each having an interior;
 a second shaft configured to pass through each hemispherical member such that the hemispherical member turns about the second shaft;
 a second stem coupled to the second shaft, the second stem configured to be coupled to the plurality of substantially hemispherical members of the second bearing.

7. The system of claim 6, further comprising:
 a magnet coupled to the bumper and configured to attract the second bearing.

8. The system of claim 6, further comprising:
 at least one connector in communication with the first roller bearing configured to include a pin for capturing the second roller bearing.

9. The system of claim 6, further comprising:
 a first connector coupled to the shaft of the first roller bearing, wherein the connector has an end opposite that shaft that is hollow;
 a second connector coupled to the second shaft of the second roller bearing, the second connector having an end opposite the second shaft of reduced circumference, wherein the reduced circumference end of the second connector at least partially fits within the hollow end of the first connector;
 a plurality of holes located in the first and second connectors such that when the second connector reduced circumference end is placed inside the first connector hollow end, the holes line up to form a connector hole; and
 a pin configured to be located in the connector hole;
 wherein the pin couples the first roller bearing to the second roller bearing.

10. The system of claim 8, wherein the at least one connector is removable from the first roller bearing.

11. The roller bearing system of claim 1, further comprising a track, the track being a hollow rod including:
 a first and second end;
 an internal volume having an internal surface;
 an external surface;

an opening extending from the internal volume to the external surface, the opening extending at least partially between the first and second ends; and a plurality of roller bearings located in the internal volume.

12. The roller bearing system of claim 1, further comprising:

a rod configured to house the first bearing, the first roller bearing configured to translate along a length of the rod; and a cap coupled to the end of the rod and configured to retain the first bearing within the rod.

13. The roller bearing system of claim 12, further comprising:

a cap magnet in communication with the cap and configured to attract the first bearing.

14. The roller bearing system of claim 12, wherein the rod includes a slot for the passage of the stem of the first bearing.

15. The roller bearing system of claim 12, wherein the first bearing is at least partially located internally within the rod.

* * * * *